United States Patent
Reshetenko et al.

(10) Patent No.: US 8,445,163 B2
(45) Date of Patent: May 21, 2013

(54) MEMBRANE ELECTRODE ASSEMBLY FOR FUEL CELL HAVING CATALYST LAYER WITH MESOPORE VOLUME, METHOD OF PREPARING SAME, AND FUEL CELL SYSTEM INCLUDING THE SAME

(75) Inventors: Tatyana Reshetenko, Yongin-si (KR); Hee-Tak Kim, Yongin-si (KR); Ho-Jin Kweon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1368 days.

(21) Appl. No.: 11/935,907

(22) Filed: Nov. 6, 2007

(65) Prior Publication Data
US 2008/0113256 A1 May 15, 2008

(30) Foreign Application Priority Data
Nov. 14, 2006 (KR) .................. 10-2006-0112210

(51) Int. Cl.
*H01M 4/02* (2006.01)
(52) U.S. Cl.
USPC ........... 429/534; 429/523; 429/512; 429/516; 429/450
(58) Field of Classification Search
USPC .................. 429/523, 534, 512, 516, 450
See application file for complete search history.

(56) References Cited

U.S. PATENT DOCUMENTS
2004/0115502 A1* 6/2004 Fukuda et al. .................. 429/33
2006/0204832 A1* 9/2006 Mei et al. ........................ 429/44

FOREIGN PATENT DOCUMENTS
| | | | |
|---|---|---|---|
| JP | 2002208406 A | * | 7/2002 |
| JP | 2005-11582 | | 1/2005 |
| KR | 10-2004-0014468 | | 2/2004 |
| KR | 10-2005-0116171 | | 12/2005 |
| KR | 10-2006-0104821 | | 10/2006 |
| WO | WO 2005/113432 A1 | | 12/2005 |

OTHER PUBLICATIONS

Patent Abstracts of Japan, Publication No. 2005-011582, dated Jan. 13, 2005, in the name of Ikiyuuma Takahashi.
Korean Patent Abstracts, Publication No. 1020040014468 A, dated Feb. 14, 2004, in the name of Yohannes Kiros.
Korean Patent Abstracts, Publication No. 1020050116171 A, dated Dec. 12, 2005, in the name of Jong Sung Yu et al.
Korean Patent Abstracts, Publication No. 1020060104821 A, dated Oct. 9, 2006, in the name of Kyu Woong Cho.

* cited by examiner

*Primary Examiner* — Zachary Best
(74) *Attorney, Agent, or Firm* — Christie, Parker & Hale, LLP (57) ABSTRACT

The membrane-electrode assembly for a fuel cell includes an anode and a cathode facing each other and a polymer electrolyte membrane interposed therebetween. The cathode includes an electrode substrate and a catalyst layer disposed on the electrode substrate, and the catalyst layer has a mesopore volume ranging from 0.013 to 0.04 cm$^3$/g. The membrane-electrode assembly has low mass resistance and contributes to the overall increased performance of the fuel cell by having optimal pore volumes (e.g., mesopore volume) in a cathode catalyst layer to provide ease of transfer and release of materials within the membrane-electrode assembly of the fuel cell.

7 Claims, 8 Drawing Sheets

MEMBRANE ELECTRODE ASSEMBLY FOR FUEL CELL HAVING CATALYST LAYER WITH MESOPORE VOLUME, METHOD OF PREPARING SAME, AND FUEL CELL SYSTEM INCLUDING THE SAME

CROSS-REFERENCE TO RELATED APPLICATION

This application claims priority to and the benefit of Korean Patent Application No. 10-2006-0112210 filed in the Korean Intellectual Property Office on Nov. 14, 2006, the entire contents of which are incorporated herein by reference.

BACKGROUND OF THE INVENTION

1. Field of the Invention

The present invention relates to a membrane-electrode assembly for a fuel cell, a method of manufacturing the same, and a fuel cell system including the same.

2. Description of the Related Art

A fuel cell is a power generation system which produces electrical energy through an electrochemical redox reaction of an oxidant and hydrogen in a hydrocarbon-based material such as methanol, ethanol, or natural gas.

Such a fuel cell is a clean energy alternative that can replace fossil fuels. A typical fuel cell includes a stack composed of unit cells which produces various ranges of power.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has relatively high energy density, and high power output, but needs a fuel reforming processor for reforming methane, methanol, natural gas, and the like in order to produce a hydrogen-rich gas as the fuel gas.

In contrast, a direct oxidation fuel cell has lower energy density than that of the polymer electrolyte fuel cell, but it does not need a fuel reforming processor and can operate at room temperature due to its relatively low operation temperature.

In a fuel cell, the stack that generates electricity includes unit cells that are stacked in multiple layers, and each of the unit cells is composed of a membrane-electrode assembly (MEA) and one or more separators (also referred to as bipolar plates). The membrane-electrode assembly has an anode (also referred to as a fuel electrode or an oxidation electrode), a cathode (also referred to as an air electrode or a reduction electrode), and a polymer electrolyte membrane between the anode and the cathode.

A fuel is supplied to the anode and absorbed in a catalyst thereof, and the fuel is oxidized to produce protons and electrons. The electrons are transferred to the cathode via an external circuit, and the protons are transferred to the cathode through the polymer electrolyte membrane. An oxidant is supplied to the cathode, and the oxidant, protons, and electrons are reacted on a catalyst at the cathode to produce heat along with water.

SUMMARY OF THE INVENTION

As aspect of an embodiment of the present invention is directed toward membrane-electrode assembly that can improve fuel cell performance, a method of manufacturing the same, and a fuel cell system including the same.

Another aspect of an embodiment of the present invention is directed toward a membrane-electrode assembly for a fuel cell that can improve a fuel cell performance by controlling a mesopore volume in a catalyst layer.

Another aspect of an embodiment of the present invention is directed toward a method for manufacturing the membrane-electrode assembly for a fuel cell.

Another aspect of an embodiment of the present invention is directed toward a fuel cell system including the membrane-electrode assembly for a fuel cell.

According to an embodiment of the present invention, a membrane-electrode assembly for a fuel cell is provided. The membrane-electrode assembly includes: an anode; a cathode facing the anode; and a polymer electrolyte membrane between the anode and the cathode. The cathode includes an electrode substrate and a catalyst layer supported by the electrode substrate, and the catalyst layer has a mesopore volume ranging from about 0.013 $cm^3/g$ to about 0.04 $cm^3/g$.

In one embodiment, the catalyst layer includes mesopores having an average pore diameter ranging from about 20 nm to about 40 nm.

In one embodiment, the catalyst layer includes a macropore volume ranging from about 0.27 $cm^3/g$ to about 0.3 $cm^3/g$.

In one embodiment, the catalyst layer includes macropores having an average pore diameter ranging from about 0.1 µm to about 5 µm.

In one embodiment, the polymer electrolyte membrane includes a polymer resin having a cation exchange group selected from the group consisting of a sulfonic acid group, a carboxylic acid group, a phosphoric acid group, a phosphonic acid group, and derivatives thereof, at its side chain.

According to another embodiment of the present invention, a method of manufacturing a membrane-electrode assembly for a fuel cell is provided. The method includes: preparing a catalyst layer composition including a catalyst, a binder resin, and a pore-forming agent; applying the catalyst layer composition on a polymer electrolyte membrane to form a catalyst layer; arranging the polymer electrolyte membrane with the catalyst layer on an electrode substrate; and hot-pressing the polymer electrolyte membrane with the catalyst layer to the electrode substrate.

In one embodiment, the preparing the catalyst layer includes sonication-treating the catalyst layer composition.

In one embodiment, the pore-forming agent includes a material selected from the group consisting of $(NH_4)_2CO_3$, $NH_4HCO_3$, $Me_2CO_3$ (Me is Li, Na, K, Rb, Cs, or Fr), $MeHCO_3$ (Me is Li, Na, K, Rb, Cs, or Fr), ammonium oxalate $((NH_4)_2C_2O_4)$, and combinations thereof.

In one embodiment, the pore-forming agent is in an amount ranging from about 1 wt % to about 20 wt %.

In one embodiment, the hot-pressing includes hot-pressing the polymer electrolyte membrane with the catalyst layer to the electrode substrate at a temperature ranging from about 100° C. to about 135° C.

In one embodiment, the hot-pressing includes hot-pressing the polymer electrolyte membrane with the catalyst layer to the electrode substrate at a pressure ranging from about 10 MPa to about 51 MPa.

In one embodiment, the catalyst is a cathode catalyst.

According to another embodiment of the present invention, a fuel cell system is provided. The fuel cell system includes an electricity generating element, a fuel supplier for supplying the electricity generating element with a fuel, and an oxidant supplier for supplying the electricity generating element with an oxidant. The electricity generating element includes a membrane-electrode assembly including an anode and a cathode facing the anode, and a polymer electrolyte membrane between the anode and the cathode, wherein the cathode includes an electrode substrate and a catalyst layer supported by the electrode substrate, and wherein the catalyst layer has a mesopore volume ranging from about 0.013 cm$^3$/g to about 0.04 cm$^3$/g, and a separator disposed on either side of the membrane-electrode assembly.

In one embodiment, the catalyst layer includes mesopores having an average pore diameter ranging from about 20 nm to about 40 nm.

In one embodiment, the catalyst layer includes a macropore volume ranging from about 0.27 cm$^3$/g to 0.3 cm$^3$/g.

In one embodiment, the catalyst layer includes macropores having an average pore diameter ranging from 0.1 μm to about 5 μm.

In one embodiment, the polymer electrolyte membrane includes a polymer resin having a cation exchange group selected from the group consisting of a sulfonic acid group, a carboxylic acid group, a phosphoric acid group, a phosphonic acid group, and derivatives thereof, at its side chains.

In one embodiment, the fuel cell system is a passive-type fuel cell system.

In one embodiment, the fuel cell system is a direct oxidation fuel cell.

In one embodiment, the catalyst layer includes a pore-forming agented and resin binded catalyst.

DETAILED DESCRIPTION

Generally, a catalyst layer of a membrane-electrode assembly is provided by coating an electrode substrate or a polymer electrolyte with a composition of a metal catalyst and a binder dispersed in a solvent. Pores present in the catalyst are for supplying a reactant such as a fuel or an oxidant and for releasing a reaction product to enhance the activity of an electrode catalyst.

If the reaction product cannot be released or is difficult to be released from the catalyst layer, it is also difficult to continue supplying the reactant to the fuel cell, and therefore power characteristics of the resultant fuel cell will be deteriorated. Accordingly, in order to improve the performance of a fuel cell, it is important to provide an optimal condition for pores to be developed within the catalyst layer so that resistance to mass transfer is minimized.

The pores in the catalyst layer are particularly important in a passive-type fuel cell where the fuel and oxidant are supplied by diffusion without using a pump, and more specifically, in the cathode where the oxidant is supplied. Therefore, in order to improve the performance of a fuel cell, it is important to control the pores in the catalyst layer of the cathode of a passive-type fuel cell.

According to an embodiment of the present invention, the mesopore volume is optimized in the catalyst layer by adding a pore-forming agent, which can be easily removed at low temperature to thereby reduce or minimize resistance to mass transfer in the catalyst layer.

The membrane-electrode assembly for a fuel cell according to another embodiment of the present invention includes an anode and a cathode facing each other and a polymer electrolyte membrane interposed therebetween.

The cathode includes an electrode substrate and a catalyst layer formed on the electrode substrate. According to another embodiment, the catalyst layer has a mesopore volume ranging from about 0.013 cm$^3$/g to about 0.04 cm$^3$/g (or from 0.013 cm$^3$/g to 0.04 cm$^3$/g). Such volumes improve the power density.

The average diameter of the mesopores may range from about 20 nm to about 40 nm (or from 20 nm to 40 nm.) When the average diameter of the mesopores is less than 20 nm, mass transfer may not be facilitated, thereby resulting in an increase of the resistance to mass transfer. On other hand, an average diameter of more than 40 nm is outside of the suitable mesopore range.

In one embodiment, the catalyst layer may include a macropore volume ranging from about 0.27 cm$^3$/g to about 0.3 cm$^3$/g (or from 0.27 cm$^3$/g to 0.3 cm$^3$/g). The macropore volume may range from about 0.27 cm$^3$/g to about 0.3 cm$^3$/g (or from 0.27 cm$^3$/g to 0.3 cm$^3$/g) to improve power density. The macropores may have an average diameter ranging from about 0.1 μm to about 5 μm (or from 0.1 μm to 5 μm). When the average diameter of the macropores is less than 0.1 μm, the generated water may not be removed effectively. On the other hand, when the diameter is more than 5 μm, the water generated from the cathode may pass through, thereby, breaking, the three-phase boundary of the catalyst, fuel and electrolyte membrane.

According to one embodiment, the catalyst layer has a pore size distribution of mesopores having an average diameter ranging from about 20 nm to about 40 nm (or from 20 nm to 40 nm) with pore volume ranging from about 0.013 cm$^3$/g to about 0.04 cm$^3$/g), and macropores having an average diameter ranging from about 0.1 μm to about 5 μm (or from 0.1 μm to 5 μm) with pore volume ranging from about 0.27 cm$^3$/g to about 0.3 cm$^3$/g.

In one embodiment, the catalyst layer also has micropores. In one embodiment, the average particle diameter of the micropores is up to 2 nm since the micropores may physically or chemically absorb other molecules (compounds).

The mesopore volume may be measured by any methods that can measure pore volume. A representative method includes a nitrogen adsorption test.

Figure 1:
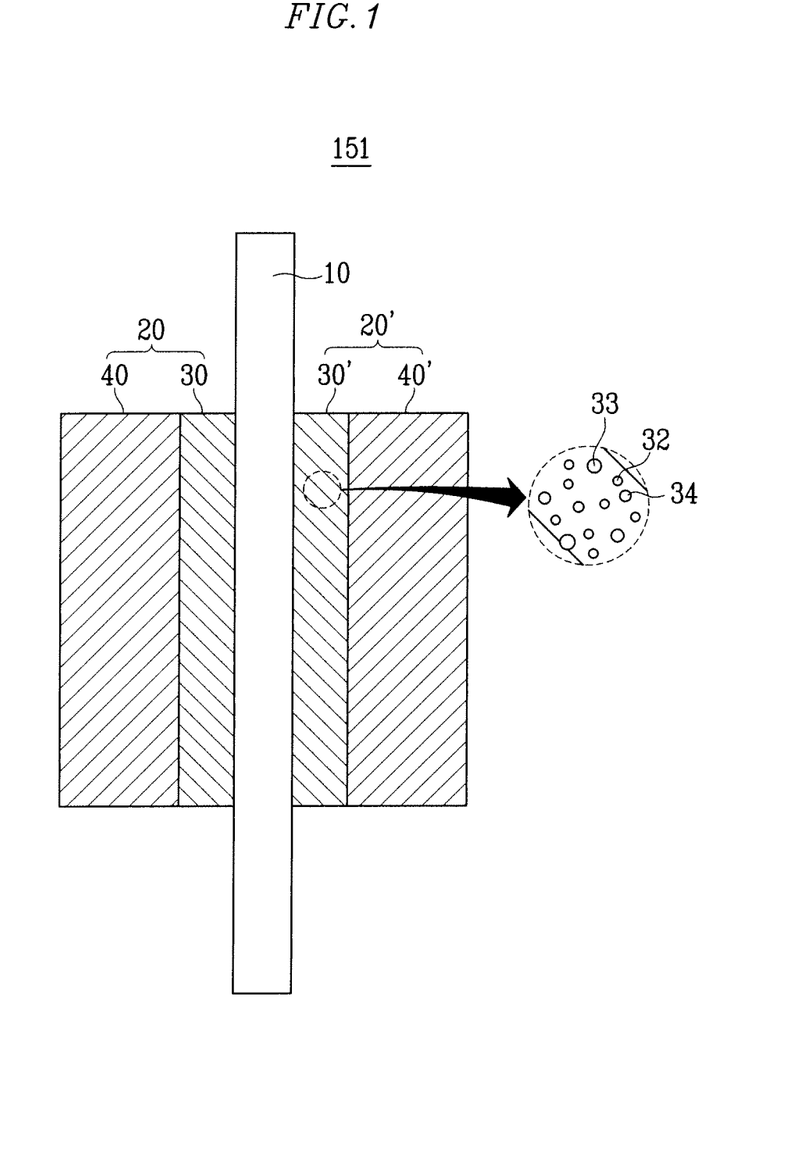
FIG. 1 is a schematic cross-sectional view showing a membrane-electrode assembly according to an embodiment of the present invention.

FIG. 1 is a schematic cross-sectional view showing a membrane-electrode assembly according to an embodiment of the present invention.

Referring to FIG. 1, a membrane-electrode assembly 151 includes an anode 20 and a cathode 20' facing each other and a polymer electrolyte membrane 10 interposed therebetween.

The anode 20 and the cathode 20' respectively include catalyst layers 30 and 30' and electrode substrates 40 and 40' supporting the catalyst layers 30 and 30'.

The cathode catalyst layer 30' includes micropores 32 for transferring an oxidant and mesopores 34 for releasing the reaction product so that the resistance to mass transfer is minimized.

According to one embodiment of the present invention, the cathode catalyst layer 30' has a mesopore volume ranging from about 0.013 cm$^3$/g to about 0.04 cm$^3$/g (or from 0.013 cm$^3$/g to 0.04 cm$^3$/g). The catalyst layer 30' may include mesopores 34 having an average pore diameter ranging from about 20 nm to about 40 nm (or from 20 nm to 40 nm) and macropores 33 having an average pore diameter ranging from about 0.1 μm to about 5 μm (or from 0.1 μm to 5 μm). When the average pore diameters of the mesopores 34 and the macropores 33 in the cathode catalyst 30' are within the above mentioned ranges, the vapor reaction product is released through the mesopores 34 and the liquid reaction product is released through the macropores 33. Therefore, the reactant and the reaction product are transferred and released. However, when the average pore diameters of the mesopores and the macropores are out of the above ranges, the mass transfer efficiency declines because the vapor and liquid reaction products are not separately transferred and released, but rather are transferred and released together.

The catalyst layers 30 and 30' include catalysts that catalytically aid in related fuel cell reactions (oxidation of an oxidant and reduction of a fuel).

The catalysts included in the catalyst layer may include any catalyst that may perform a fuel cell reaction such as a platinum-based catalyst. The platinum-based catalyst may include a material selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. The same (or substantially the same) catalyst may be used for an anode and a cathode as aforementioned. In one embodiment, a platinum-ruthenium alloy catalyst is used as an anode catalyst in a direct oxidation fuel cell to prevent or reduce catalyst poisoning due to CO generated during the anode reaction. In one embodiment, the platinum-based catalyst is selected from Pt, Pt/Ru, Pt/W, Pt/Ni, PT/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and/or Pt/Ru/Sn/W.

Such a metal catalyst may be used in the form of a metal itself (black catalyst), or be supported on a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. In one embodiment, carbon is used.

The catalyst layers 30 and 30' may include a binder resin to improve adherence and proton transfer properties.

The binder resin may be a proton conductive polymer resin including a cation exchange group selected from the group consisting of a sulfonic acid group, a carboxylic acid group, a phosphoric acid group, a phosphonic acid group, and derivatives thereof, at its side chain. Non-limiting examples of the polymer include a proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combination thereof. In one embodiment, the proton conductive polymer is poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), and/or copolymers thereof.

The H of a proton conductive group in the side chain of the proton conductive polymer may be substituted with Na, K, Li, Cs, or tetrabutyl ammonium. For example, when H is substituted with Na in an ion exchange group at the terminal end of the proton conductive group, NaOH can be used. When H is substituted with tetrabutyl ammonium, tributyl ammonium hydroxide can be used. Similarly, K, Li, or Cs can also be used as substitutes using appropriate compounds.

The binder resin may include only one type of resin or is in form of a mixture. Further, the binder resin may be used along with a non-conductive polymer to improve adherence between the polymer electrolyte membrane and the catalyst layer. The amount of the binder resin may be varied to achieve certain desired characteristics.

Examples of the non-conductive polymer include, but are not limited to, polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoroethylene copolymers (ECTFE), polyvinylidene fluoride, polyvinylidene fluoride-hexafluoropropylene copolymers (PVdF-HFP), dodecyl benzene sulfonic acid, and/or sorbitol.

The catalyst layers 30 and 30' are supported by electrode substrates 40 and 40'.

The electrode substrates 40 and 40' respectively support the anode 20 and the cathode 20'. They also provide pathways for transferring the fuel and the oxidant to catalyst layers 30 and 30'.

In one embodiment, electrode substrates 40 and 40' are formed from a material such as carbon paper, carbon cloth, carbon felt, or a metal cloth (a porous film composed of a metal fiber or a metal film disposed on a surface of a cloth composed of polymer fibers). However, the material for electrode substrates is not limited thereto.

The electrode substrates 40 and 40' may be treated with a fluorine-based resin to be water-repellent to prevent (or reduce) deterioration of diffusion efficiency due to water generated during operation of the fuel cell. The fluorine-based resin may include polyvinylidene fluoride, polytetrafluoroethylene, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer may be added between the aforementioned electrode substrates 40 and 40' and the catalyst layers 30 and 30' to increase reactant diffusion effects. The microporous layer generally includes conductive powders with a particular particle diameter. The conductive material may include, but is not limited to, carbon powder, carbon black, acetylene black, activated carbon, carbon fiber, fullerene, and/or nano-carbon. The nano-carbon may include a material such as carbon nanotubes, carbon nanofiber, carbon nanowire, carbon nanohorns, and/or carbon nanorings.

The microporous layer is formed by coating a composition including a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol, and so on; water; dimethyl acetamide, dimethyl sulfoxide; N-methylpyrrolidone; and/or tetrahydrofuran. The coating method may include, but is not limited to, screen printing, spray coating, doctor blade methods, gravure coating, dip coating, silk screening, painting, and so on, depending on the viscosity of the composition.

The membrane-electrode assembly 151 including the anode 20' and the cathode 20 includes a polymer electrolyte membrane 10 between the anode 20' and the cathode 20.

The polymer electrolyte membrane 10 functions as an ion exchanger by delivering protons produced at the catalyst layer 30' of the anode 20' to the catalyst layer 30 of the cathode 20. The proton conductive electrolyte membrane 10 may include a polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include a proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer includes a material selected from the group consisting of poly(perfluorosulfonic acid), poly(perfluorocarboxylic acid), a copolymer of tetrafluoroethylene and fluorovinylether including a sulfonic acid group, defluorinated polyetherketone sulfide, aryl ketone, poly(2,2'-(m-phenylene)-5,5'-bibenzimidazole), poly(2,5-benzimidazole), copolymers thereof, and mixtures thereof.

The H of a proton conductive group in a side chain of the proton conductive polymer may be substituted with Na, K, Li, Cs, or tetrabutyl ammonium. For example when H is substituted with Na in an ion exchange group at the terminal end of the proton conductive group, NaOH can be used. When H is substituted with tetrabutyl ammonium, tributyl ammonium hydroxide can be used. Similarly, K, Li, or Cs can also be used as substitutes using appropriate compounds.

The membrane-electrode assembly includes a cathode formed with pores having the optimal mesopore volume. Therefore, the resistance to mass transfer is minimized and the energy conversion (or battery) characteristics of the fuel cell are improved. Further, as such effects are maximized when it is applied to the passive-type fuel cell, the membrane-electrode assembly according to an embodiment of the present invention is more appropriately applied to the passive-type fuel cell.

According to an embodiment of the present invention, a catalyst layer of the cathode can be constructed as follows:

First, a catalyst, a binder, a pore-forming agent, and a solvent are mixed to provide a catalyst layer composition. The pore-forming agent is used in an amount ranging from about 1 wt % to about 20 wt % (or from 1 wt % to 20 wt %). When the amount of the pore-forming agent is less than 1 wt %, it may not affect the textural properties of the catalyst layer. On the other hand, when it is more than 20 wt %, the mesopore volume is too large, such that the contact areas between the catalyst particles and the binder are decreased, thereby deteriorating the power density. According to another embodiment, when the amount of $(NH_4)_2CO_3$ is added at a range from about 1 wt % to about 5 wt % (or from 1 wt % to 5 wt %), or $NH_4HCO_3$ is added at a range from about 1 wt % to about 10 wt % (or from 1 wt % to 10 wt %), significant improvement in power density can be seen in a passive-type direct oxidation fuel cell. In one embodiment, the power density is improved by about 30% to about 40% at about 50° C.

In one embodiment of the present invention, the amounts of the catalyst, binder, and solvent may be suitably adjusted so long as the pore-forming agent amount stays within a range from about 1 wt % to about 20 wt % (or from 1 wt % to 20 wt %.).

The catalyst and the binder are the same (or substantially the same) as above-mentioned. The solvent may include an alcohol such as water, methanol, ethanol, isopropyl alcohol, N-methylpyrrolidone, dimethylacetamide, dimethylsulfoxide, tetrahydrofuran, acetone, or mixtures thereof.

The pore-forming agent may be $(NH_4)_2CO_3$, $NH_4HCO_3$, $Me_2CO_3$ (Me is Li, Na, K, Rb, Cs, or Fr), $MeHCO_3$ (Me is Li, Na, K, Rb, Cs, or Fr), and/or ammonium oxalate $((NH_4)_2C_2O_4)$.

The pore-forming agent is removed during the subsequent hot-pressing process to provide pores in the catalyst layer. The desirable pore size may be obtained by controlling the size or the amount of the pore-forming agent. Generally, the size of the pore-forming agent ranges from about 1 nm to about 100 μm (or from 1 nm to 100 μm). Such pore-forming agent size may be controlled during the mixing process.

A process for sonication-treating the catalyst layer composition may be further performed. By using ultrasonic waves, the catalyst is more dispersed to provide more uniform catalyst particles having a diameter ranging from about 200 nm to about 300 nm (or from 200 nm to 300 nm). As a result, it is possible to form a catalyst layer having a high electrical active region.

Figure 2:
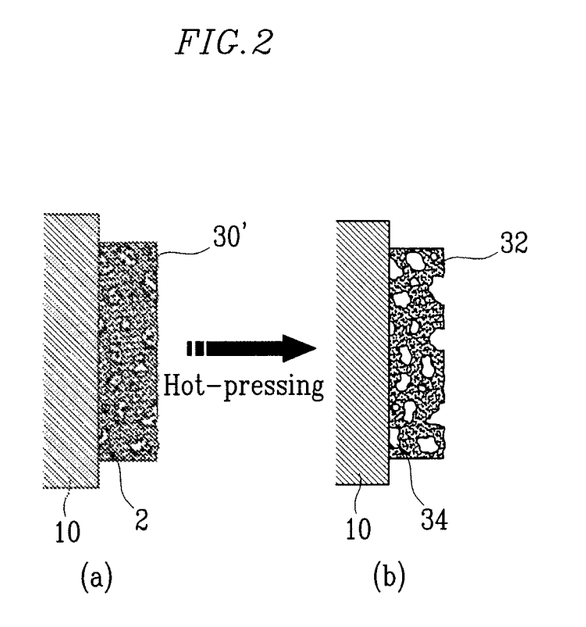
FIG. 2 schematically shows a pore formation process in a catalyst layer of a membrane-electrode assembly according to an embodiment of the present invention.

The catalyst layer composition is coated on the polymer electrolyte membrane 10 to provide a catalyst layer 30' as shown in section (a) of FIG. 2. The provided catalyst layer includes a pore-forming agent 2 as shown in section (a) of FIG. 2. The method of forming the catalyst layer 30' includes any suitable method such as slot die, screen-printing, spraying, or doctor blade coating methods.

The polymer electrolyte membrane includes a proton conductive polymer as mentioned above.

An electrode substrate is disposed on the polymer electrolyte membrane formed with the catalyst coating layer and hot-pressed to provide a cathode. During the hot-pressing process, the pore-forming agent 2 is fused and removed to provide pores 32 and 34 in the catalyst layer as shown in section (b) of FIG. 2.

The hot-pressing process may be performed at a temperature ranging from about 100° C. to about 135° C. (or from 100° C. to 135° C.), and under a pressure ranging from about 10 MPa to about 51 MPa (or from 10 MPa to 51 MPa). If the hot-pressing process is performed at a higher temperature than 135° C. and under a higher pressure than 51 MPa, the polymer electrolyte membrane and the electrode substrate can be damaged. On the other hand, when the hot-pressing process is performed at a temperature lower than 100° C. and under a pressure lower than 10 MPa, the catalyst, the binder, and the polymer electrolyte membrane may be insufficiently contacted, which is important to the ionic conductivity and the electronic conductivity.

The provided method above produces a cathode of the membrane-electrode assembly with pores having optimal mesopore volumes. The pores minimize (or reduce) the resistance to the mass transfer and increase the overall fuel cell efficiency when the fuel cell is in operation. Such a membrane-electrode assembly may be applied to any fuel cell system. According to another embodiment of the present invention, it is applied to a direct oxidation fuel cell system. According to a further embodiment, it is applied to a passive-type fuel cell system.

According to an embodiment of the present invention, a fuel cell system including the above membrane-electrode assembly is provided.

The fuel cell system includes at least one electricity generating element including the membrane-electrode assembly and a separator, a fuel supplier for supplying the electricity generating element with a fuel, and an oxidant supplier for supplying the electricity generating element with an oxidant.

The electricity generating element includes a membrane-electrode assembly and a separator (also, referred to as a bipolar plate) and is for generating electricity through oxidation of a fuel and reduction of an oxidant.

The fuel supplier is for supplying the electricity generating element with a fuel including hydrogen, and the oxidant supplier is for supplying the electricity generating element with an oxidant. The oxidant may be oxygen or air. The fuel includes liquid or gaseous hydrogen, or a hydrocarbon-based fuel such as methanol, ethanol, propanol, butanol, or natural gas.

Figure 3:
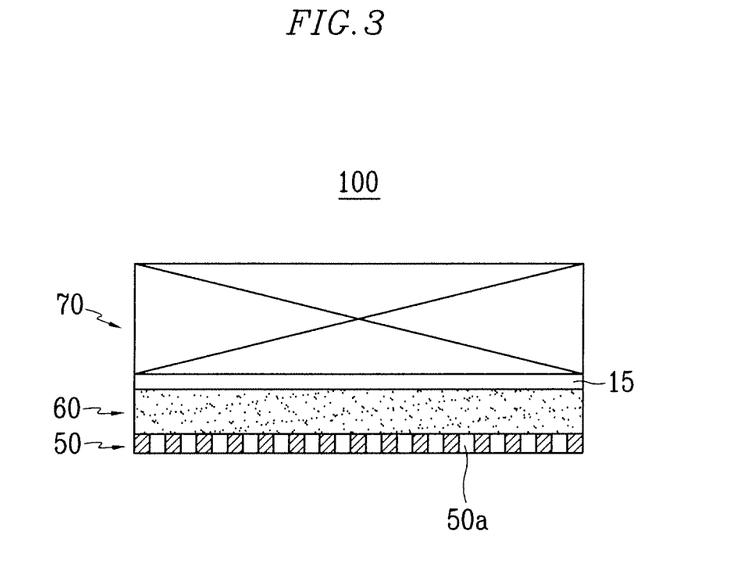
FIG. 3 is a schematic diagram showing the structure of a fuel cell system according to an embodiment of the present invention.
Figure 4:
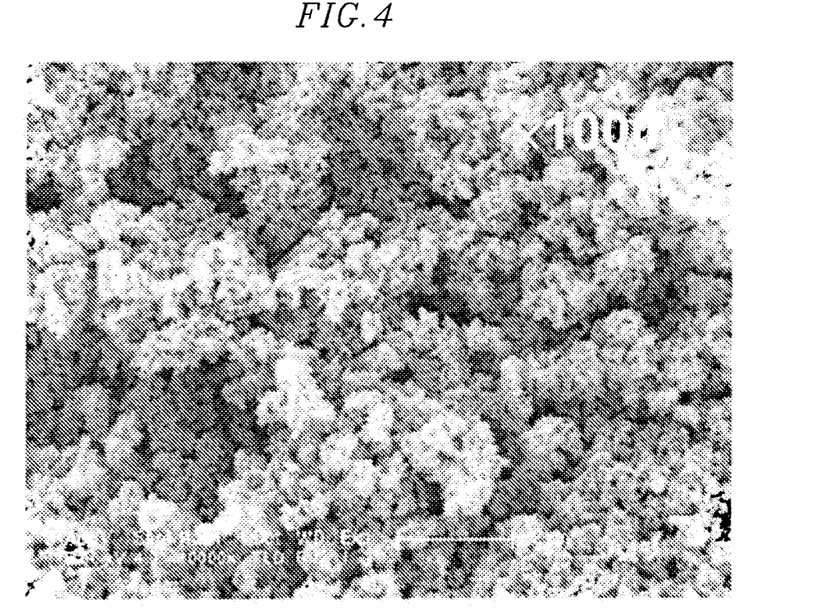
FIG. 4 is a scanning electron microscope (SEM) photograph of a cross-section of a cathode catalyst layer of a membrane-electrode assembly according to Example 1.
Figure 5:
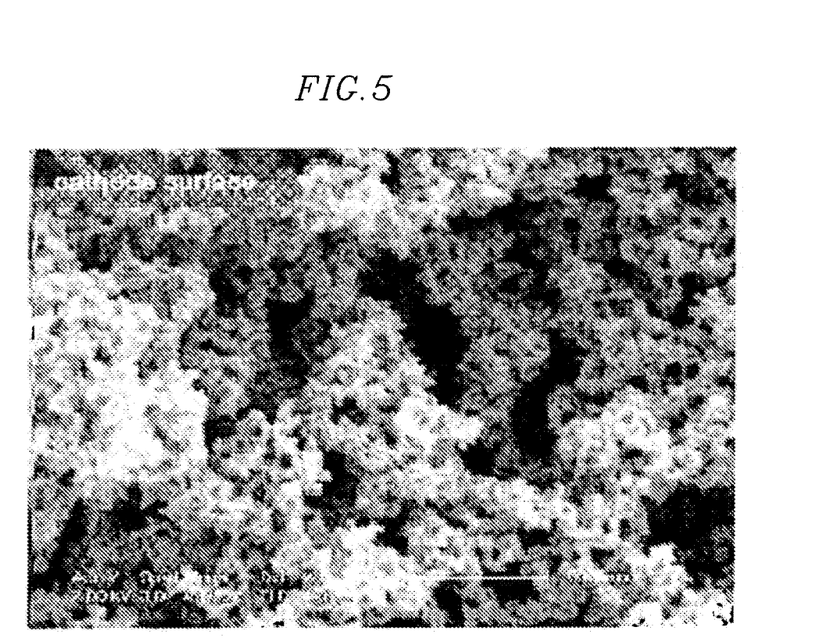
FIG. 5 is a SEM photograph of a cross-section of a cathode catalyst layer of a membrane-electrode assembly according to Example 5.
Figure 6:
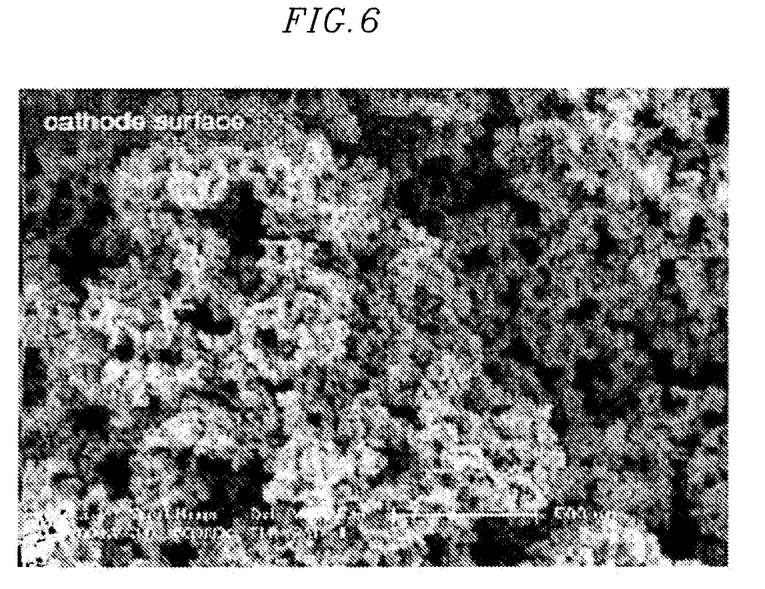
FIG. 6 is a SEM photograph of a cross-section of a cathode catalyst layer of a membrane-electrode assembly according to Example 6.
Figure 7:
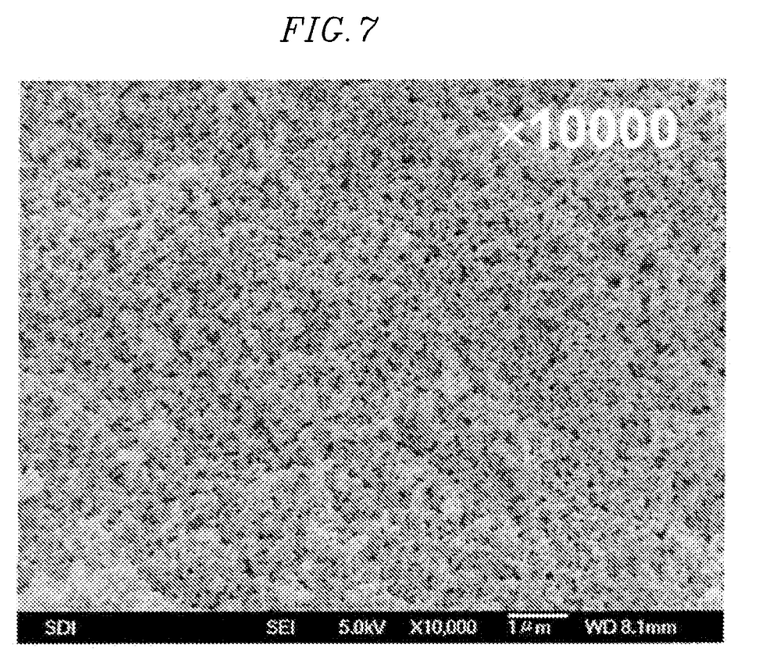
FIG. 7 is a SEM photograph of a cross-section of a cathode catalyst layer of a membrane-electrode assembly according to Example 10.
Figure 8:
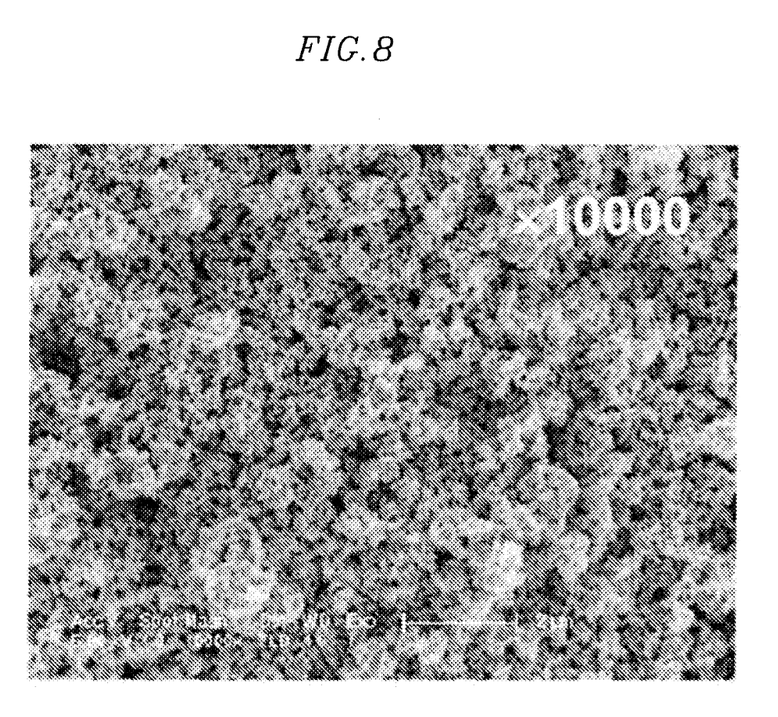
FIG. 8 is a SEM photograph of a cross-section of a cathode catalyst layer of a membrane-electrode assembly according to Comparative Example 1.

FIG. 3 shows a schematic structure of a fuel cell system that will be described in detail as follows. FIG. 3 illustrates a fuel cell system wherein a fuel and an oxidant are provided to an electricity generating element in a diffusion manner, but the present invention is not limited to such a structure. The fuel cell system of the present invention may alternatively include a structure wherein a fuel and an oxidant are provided through pumps.

The fuel cell system 100 includes at least one electricity generating element 60 that generates electrical energy through an electrochemical reaction of a fuel and an oxidant, a fuel supplier 70 for supplying the fuel to the electricity generating element 60, and an oxidant supplier 50 for supplying the oxidant to the electricity generating element 60.

The electricity generating element 60 includes at least one membrane-electrode assembly, and a separator 15 arranged between the electricity generating element 60 and the fuel supplier 70.

The oxidant supplier 50 is disposed at the one side of the electricity generating element 60 that does not contact the fuel supplier 70. The oxidant supplier 50 acts as a separator, and also supplies an oxidant to the electricity generating element 60 through a plurality of openings 50*a*.

The following examples illustrate the present invention in more detail. However, the present invention is not limited by these examples.

Example 1

88 wt % of a Pt—Ru black catalyst (manufactured by Johnson Matthey) and 12 wt % of a 5 wt % Nafion/$H_2O$/2-propanol binder (Solution Technology Inc.) were mixed to provide a catalyst composition for an anode. The provided catalyst composition for the anode was coated on a Nafion 115 (perfluorosulfonate) polymer electrolyte membrane to provide an anode catalyst layer. The catalyst was loaded on (or in) the anode in an amount of 6 mg/cm$^2$.

87 wt % of a Pt black catalyst (manufactured by Johnson Matthey), 12 wt % of a 5 wt % Nafion/$H_2O$/2-propanol binder (Solution Technology Inc.), and 1 wt % of a $(NH_4)_2CO_3$ pore-forming agent were mixed to provide a catalyst composition for a cathode. The pore-forming agent had an initial particle size ranging from about 30 to about 50 μm. The catalyst composition for the cathode was spray-coated on a surface of a polymer electrolyte membrane facing away the anode catalyst layer to provide a cathode catalyst layer. The loading amount of the catalyst on (or in) the cathode was 6 mg/cm$^2$.

An electrode substrate was disposed to contact with the anode catalyst layer, and another electrode substrate was disposed to contact the cathode catalyst layer. It is then hot-pressed at a temperature of 135° C. under a pressure of 51 MPa to provide a membrane-electrode assembly for a fuel cell. The cathode catalyst layer of the membrane-electrode assembly produced by the above process has micropores having an average particle diameter of 2 nm, mesopores having an average particle diameter of 30 nm, and macropores having an average diameter of 1 um. The mesopore volume was 0.013 cm$^3$/g, the macropore volume was 0.275 cm$^3$/g, and a specific surface area (BET) was 3.32 m$^2$/g.

The specific surface area and mesopore volume were measured by the following nitrogen adsorption test protocol:

The nitrogen adsorption test was carried out with a static volumetric apparatus (Micromeritics, ASAP-2020) at a temperature of 77K. The specific surface area, the mesopore volume, and the macropore volume were calculated based on the nitrogen adsorption isotherm line. The mesopore volume and macropore volume were measured at a nitrogen partial pressure condition of P/P0=0.98.

Then, the membrane-electrode assembly was placed between two gaskets, which were then inserted between two separators each formed with a gas flow channel and a cooling channel having certain shapes; and compressed between copper end plates to form a unit cell.

Example 2

A unit cell was fabricated in accordance with the same (or substantially the same) procedure as in Example 1 except that a $(NH_4)_2CO_3$ pore-forming agent was added at 3 wt % to provide a catalyst composition for a cathode. The cathode catalyst layer had micropores having an average particle diameter of 2 nm, mesopores having an average particle diameter of 30 nm, and macropores having an average particle diameter of 1.5 μm. The mesopore volume was 0.017 cm$^3$/g, the macropore volume was 0.292 cm$^3$/g, and the specific surface area (BET) was 3.52 m$^2$/g.

Example 3

A unit cell was fabricated in accordance with the same (or substantially the same) procedure as in Example 1 except that a $(NH_4)_2CO_3$ pore-forming agent was added at 5 wt % to provide a catalyst composition for a cathode. The cathode catalyst layer had micropores having an average particle diameter of 2 nm, mesopores having an average particle diameter of 30 nm, and macropores having an average particle diameter of 1.5 μm. The mesopore volume was 0.014 cm$^3$/g, the macropore volume was 0.28 cm$^3$/g, and the specific surface area (BET) was 3.4 m$^2$/g.

Example 4

A unit cell was fabricated in accordance with the same (or substantially the same) procedure as in Example 1 except that a $(NH_4)_2CO_3$ pore-forming agent was added at 10 wt % to provide a catalyst composition for a cathode. The cathode catalyst layer had micropores having an average particle diameter of 2 nm, mesopores having an average particle diameter of 30 nm, and macropores having an average particle diameter of 2.0 μm. The mesopore volume was 0.014 $cm^3/g$, the macropore volume was 0.297 $cm^3/g$, and the specific surface area (BET) was 3.2 $m^2/g$.

Example 5

A unit cell was fabricated in accordance with the same (or substantially the same) procedure as in Example 1 except that a $(NH_4)_2CO_3$ pore-forming agent was added at 20 wt % to provide a catalyst composition for a cathode. The cathode catalyst layer had micropores having an average particle diameter of 2 nm, mesopores having an average particle diameter of 30 nm, and macropores having an average particle diameter of 2.5 μm. The mesopore volume was 0.015 $cm^3/g$, the macropore volume was 0.289 $cm^3/g$, and the specific surface area (BET) was 3.57 $m^2/g$.

Example 6

A unit cell was fabricated in accordance with the same (or substantially the same) procedure as in Example 1 except that 1 wt % of a $NH_4HCO_3$ pore-forming agent was added instead of 3 wt % of $(NH_4)_2CO_3$ to provide a catalyst composition for a cathode. The cathode catalyst layer had micropores having an average particle diameter of 2 nm, mesopores having an average particle diameter of 30 nm, and macropores having an average particle diameter of 1.2 μm. The mesopore volume was 0.027 $cm^3/g$, the macropore volume was 0.281 $cm^3/g$, and the specific surface area (BET) was 3.16 $m^2/g$.

Example 7

A unit cell was fabricated in accordance with the same (or substantially the same) procedure as in Example 5 except that a $NH_4HCO_3$ pore-forming agent was added at 3 wt % to provide a catalyst composition for a cathode. The cathode catalyst layer had micropores having an average particle diameter of 2 nm, mesopores having an average particle diameter of 30 nm, and macropores having an average particle diameter of 1.3 μm. The mesopore volume was 0.031 $cm^3/g$, the macropore volume was 0.291 $cm^3/g$ and the specific surface area (BET) was 4.0 $m^2/g$.

Example 8

A unit cell was fabricated in accordance with the same (or substantially the same) procedure as in Example 5 except that a $NH_4HCO_3$ pore-forming agent was added at 5 wt % to provide a catalyst composition for a cathode. The cathode catalyst layer had micropores having an average particle diameter of 2 nm, mesopores having an average particle diameter of 30 nm, and macropores having an average particle diameter of 1.7 μm. The mesopore volume was 0.035 $cm^3/g$, the macropore volume was 0.279 $cm^3/g$, and the specific surface area (BET) was 4.32 $m^2/g$.

Example 9

A unit cell was fabricated in accordance with the same (or substantially the same) procedure as in Example 5 except that a $NH_4HCO_3$ pore-forming agent was added at 10 wt % to provide a catalyst composition for a cathode. The cathode catalyst layer had micropores having an average particle diameter of 2 nm, mesopores having an average particle diameter of 30 nm, and macropores having an average particle diameter of 2 μm. The mesopore volume was 0.032 $cm^3/g$, the macropore volume was 0.294 $cm^3/g$, and the specific surface area (BET) was 3.84 $m^2/g$.

Example 10

A unit cell was fabricated in accordance with the same (or substantially the same) procedure as in Example 5 except that a $NH_4HCO_3$ pore-forming agent was added at 20 wt % to provide a catalyst composition for a cathode. The cathode catalyst layer had micropores having an average particle diameter of 2 nm, mesopores having an average particle diameter of 30 nm, and macropores having an average particle diameter of 2.4 μm. The mesopore volume was 0.040 $cm^3/g$, the macropore volume was 0.298 $cm^3/g$, and the specific surface area (BET) was 5.06 $m^2/g$.

Comparative Example 1

88 wt % of a Pt—Ru black catalyst (manufactured by Johnson Matthey) and 12 wt % of a 5 wt % Nafion/H2O/2-propanol binder (Solution Technology Inc.) were mixed to provide a catalyst composition for an anode. Then, the provided catalyst composition was coated on a carbon paper electrode substrate to provide the anode. The catalyst was loaded on (or in) the anode in an amount of 6 $mg/cm^2$.

88 wt % of a Pt black catalyst (manufactured by Johnson Matthey) and 12 wt % of a 5 wt % Nafion/$H_2O$/2-propanol binder (Solution Technology Inc.) were mixed to provide a catalyst composition for the cathode. Then, the catalyst composition was coated on a carbon paper electrode substrate to provide a cathode. The loading amount of the catalyst on (or in) the cathode was 6 $mg/cm^2$, and this provided the cathode catalyst layer with micropores having an average particle diameter of 2 nm, mesopores having an average particle diameter of 25 nm, and macropores having an average diameter of 0.7 μm. The mesopore volume was 0.012 $cm^3/g$, the macropore volume was 0.23 $cm^3/g$, and a specific surface area (BET) was 1.66 $m^2/g$.

A membrane-electrode assembly was provided by using the provided anode and cathode and a commercially available Nafion 115 (perfluorosulfonate) polymer electrolyte membrane.

SEM Photograph

FIG. 4 to FIG. 8 respectively show scanning electron microscope (SEM) photographs of cathode catalyst layers of membrane-electrode assemblies according to Examples 1, 2, 6, and 8. As shown in FIG. 4 to FIG. 8, Examples 1, 2, 6, and 8, in which pore-forming agents were used, had larger mesopore volumes. In contrast, Comparative Example 1 in which a pore-forming agent was not used, had smaller pores.

Power Density

Figure 9:
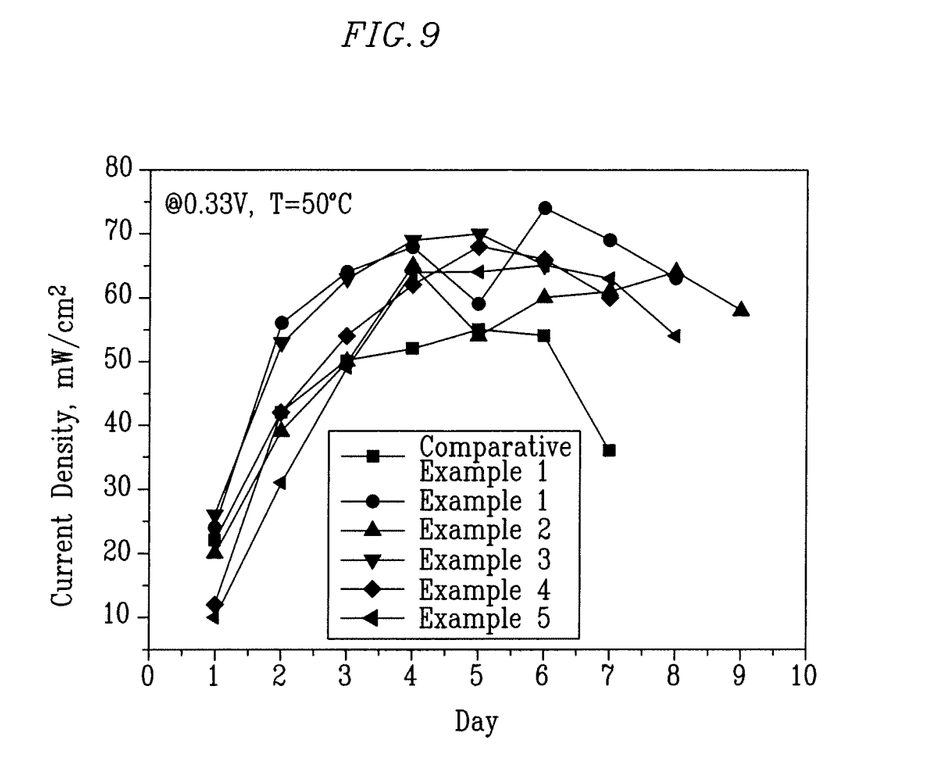
FIG. 9 is a graph showing power density of fuel cells according to Examples 1 to 4 and 10 of the present invention and Comparative Example 1.

The fuel cells according to Example 1 to 5 and Comparative Example 1 were operated under the condition of 0.33V and 50° C. for 10 days to measure a power density, and the results are shown in FIG. 9. As shown in FIG. 9, the power densities of the fuel cells according to Examples 1 to 5 were superior to that of Comparative Example 1.

Figure 10:
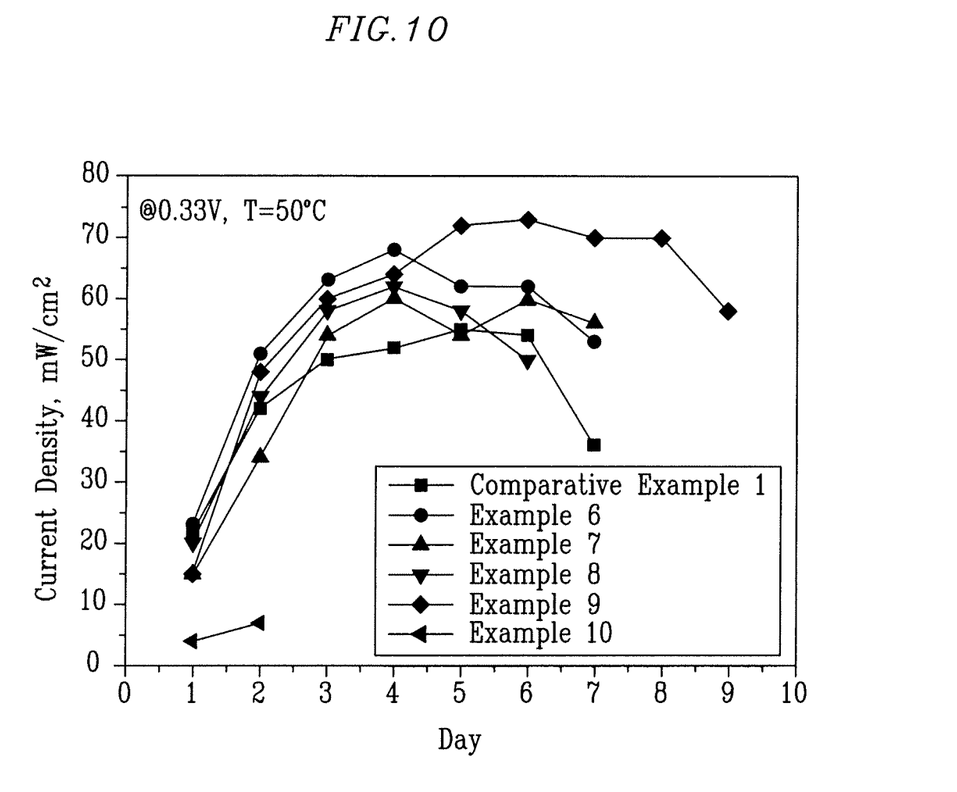
FIG. 10 is a graph showing power density of fuel cells according to Examples 5 to 9 and 10 of the present invention and Comparative Example 1.

In addition, the fuel cells fabricated from Examples 6 to 9 and Comparative Example 1 were operated under the conditions of 0.33V and 50° C. for 10 days to measure power densities, and the results are shown in FIG. 10. As shown FIG.

10, the power densities of the fuel cells according to Examples 6 to 9 were superior to that of Comparative Example 1 after 4 days.

The fuel cells according to Examples 1 to 9 and Comparative Example 1 were operated at 50° C. and 70° C. for 9 days, and then the power densities were measured. The results are shown in the following Table 1.

TABLE 1

| | Anode Pt—Ru (mg/cm$^2$) | Cathode Pt (mg/cm$^2$) | Pore-forming agent (wt %) | Temperature (° C.) | Power density (mW/cm$^2$) 1$^{st}$ day | 2$^{nd}$ day | 3$^{rd}$ day | 4$^{th}$ day | 5$^{th}$ day | 6$^{th}$ day | 7$^{th}$ day | 8$^{th}$ day | 9$^{th}$ day |
|---|---|---|---|---|---|---|---|---|---|---|---|---|---|
| Comparative Example 1 | 6 | 6 | 0 | 50 | 24 | 42 | 50 | 52 | 55 | 54 | 36 | — | — |
| | | | | 70 | 45 | 64 | 70 | 70 | 71 | 73 | 43 | — | — |
| Example 1 | 6 | 6 | 1 | 50 | 24 | 56 | 64 | 62 | 59 | 74 | 69 | 63 | — |
| | | | | 70 | 52 | 79 | 87 | 80 | 91 | 80 | 81 | 71 | — |
| Example 2 | 6 | 6 | 3 | 50 | 20 | 39 | 50 | 65 | 54 | 60 | 61 | 64 | 58 |
| | | | | 70 | 35 | 67 | 76 | 83 | 77 | 80 | 66 | 71 | 72 |
| Example 3 | 6 | 6 | 5 | 50 | 26 | 53 | 63 | 69 | 70 | 65 | — | — | — |
| | | | | 70 | 47 | 71 | 90 | 84 | 85 | 57 | — | — | — |
| Example 4 | 6 | 6 | 10 | 50 | 12 | 42 | 54 | 68 | 68 | 66 | 60 | — | — |
| | | | | 70 | 21 | 61 | 77 | 92 | 93 | 91 | 84 | — | — |
| Example 5 | 6 | 6 | 20 | 50 | 10 | 31 | 49 | 64 | 64 | 65 | 63 | 54 | — |
| | | | | 70 | 16 | 52 | 73 | 85 | 85 | 85 | 85 | 79 | — |
| Example 6 | 6 | 6 | 1 | 50 | 23 | 51 | 63 | 68 | 62 | 62 | 53 | — | — |
| | | | | 70 | 46 | 78 | 86 | 91 | 75 | 77 | 69 | — | — |
| Example 7 | 6 | 6 | 3 | 50 | 15 | 34 | 54 | 60 | 54 | 60 | 56 | — | — |
| | | | | 70 | 27 | 64 | 64 | 74 | 60 | 75 | 70 | — | — |
| Example 8 | 6 | 6 | 5 | 50 | 20 | 44 | 58 | 62 | 58 | 50 | — | — | — |
| | | | | 70 | 34 | 58 | 75 | 77 | 72 | 69 | — | — | — |
| Example 9 | 6 | 6 | 10 | 50 | 15 | 48 | 60 | 64 | 72 | 73 | 70 | 70 | 58 |
| | | | | 70 | 26 | 73 | 89 | 98 | 92 | 90 | 87 | 87 | 78 |
| Example 10 | 6 | 6 | 20 | 50 | 4 | 7 | — | — | — | — | — | — | — |
| | | | | 70 | 4 | 3 | — | — | — | — | — | — | — |

The results at the fourth day are important results because they show that the power densities of Examples 1 to 10 were superior to that of Comparative Example 1 at both 50° C. and 70° C.

The membrane-electrode assembly for a fuel cell according to one embodiment of the present invention includes a cathode having an optimal mesopore volume, which facilitates transfer and release of materials through the pores. As the result, the performance of a fuel cell is improved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A membrane-electrode assembly for a fuel cell, comprising:
   an anode;
   a cathode facing the anode; and
   a polymer electrolyte membrane between the anode and the cathode,
   wherein the cathode comprises an electrode substrate and a catalyst layer supported by the electrode substrate,
   wherein the catalyst layer comprises mesopores having an average pore diameter ranging from about 20 nm to about 40 nm and has a mesopore volume ranging from about 0.013 cm$^3$/g to about 0.04 cm$^3$/g,
   wherein the catalyst layer comprises macropores having an average pore diameter ranging from about 0.1 μm to about 5 μm and has a macropore volume ranging from about 0.27 cm$^3$/g to about 0.3 cm$^3$/g, and
   wherein the catalyst layer has a specific surface area (BET) of between about 3.16 m$^2$/g and about 5.06 m$^2$/g.

2. The membrane-electrode assembly of claim 1, wherein the polymer electrolyte membrane comprises a polymer resin having a cation exchange group selected from the group consisting of a sulfonic acid group, a carboxylic acid group, a phosphoric acid group, a phosphonic acid group, and derivatives thereof, at its side chain.

3. A fuel cell system comprising:
   an electricity generating element comprising:
      a membrane-electrode assembly comprising:
         an anode,
         a cathode facing the anode, and
         a polymer electrolyte membrane between the anode and the cathode,
            wherein the cathode comprises an electrode substrate and a catalyst layer supported by the electrode substrate,
            wherein the catalyst layer comprises mesopores having an average pore diameter ranging from about 20 nm to about 40 nm and has a mesopore volume ranging from about 0.013 cm$^3$/g to about 0.04 cm$^3$/g,
            wherein the catalyst layer comprises macropores having an average pore diameter ranging from about 0.1 μm to about 5 μm and has a macropore volume ranging from about 0.27 cm$^3$/g to about 0.3 cm$^3$/g, and
            wherein the catalyst layer has a specific surface area (BET) of between about 3.16 m$^2$/g and about 5.06 m$^2$/g, and
      a separator on at least one side of the membrane-electrode assembly;
   a fuel supplier for supplying the electricity generating element with a fuel; and an oxidant supplier for supplying the electricity generating element with an oxidant.

4. The fuel cell system of claim 3, wherein the polymer electrolyte membrane comprises a polymer resin having a cation exchange group selected from the group consisting of a sulfonic acid group, a carboxylic acid group, a phosphoric acid group, a phosphonic acid group, and derivatives thereof, at its side chain.

5. The fuel cell system of claim 3, wherein the fuel cell system is a passive-type fuel cell system.

6. The fuel cell system of claim 3, wherein the fuel cell system is a direct oxidation fuel cell.

7. The fuel cell system of claim 3, wherein the catalyst layer is a pore-forming agented and resin binded catalyst.

* * * * *